United States Patent
Ziegler

(10) Patent No.: US 8,912,914 B2
(45) Date of Patent: Dec. 16, 2014

(54) APPARATUS FOR THE TREATMENT OF CONTAINERS WITH COMBINED SIZE-PART AND FITTING DETECTION

(75) Inventor: Manfred Ziegler, Passau (DE)

(73) Assignee: Krones AG, Neutraubling (DE)

( * ) Notice: Subject to any disclaimer, the term of this patent is extended or adjusted under 35 U.S.C. 154(b) by 812 days.

(21) Appl. No.: 12/964,731

(22) Filed: Dec. 9, 2010

(65) Prior Publication Data

US 2011/0169609 A1    Jul. 14, 2011

(30) Foreign Application Priority Data

Dec. 14, 2009   (DE) .......................... 10 2009 058 087

(51) Int. Cl.
| | | |
|---|---|---|
| G08B 23/00 | (2006.01) | |
| B65C 9/40 | (2006.01) | |
| B29C 49/78 | (2006.01) | |
| B29C 49/42 | (2006.01) | |
| B67C 3/00 | (2006.01) | |
| B67B 3/26 | (2006.01) | |

(52) U.S. Cl.
CPC . B65C 9/40 (2013.01); B29C 49/78 (2013.01); B29C 49/42 (2013.01); B67C 3/007 (2013.01); B67B 3/26 (2013.01)
USPC .................. 340/693.9; 340/391.1; 340/572.8; 340/693.6; 340/10.1

(58) Field of Classification Search
USPC ............ 340/686.1, 10.1, 693.9, 691.1, 691.7, 340/693.5, 693.6, 572.8, 391.1; 700/213; 53/415, 466, 135.3
See application file for complete search history.

(56) References Cited

U.S. PATENT DOCUMENTS

| | | | | |
|---|---|---|---|---|
| 4,239,435 A * | 12/1980 | Weiss et al. | ................. | 198/349.8 |
| 4,352,421 A * | 10/1982 | Olsson et al. | ................. | 198/392 |
| 4,792,738 A * | 12/1988 | Yamazaki et al. | ............ | 318/630 |
| 5,840,223 A * | 11/1998 | Feuerherm et al. | .......... | 264/40.1 |
| 6,857,714 B2 * | 2/2005 | Ream et al. | ........................ | 347/2 |
| 6,961,000 B2 * | 11/2005 | Chung | ........................ | 340/572.1 |
| 7,088,248 B2 * | 8/2006 | Forster | ........................ | 340/572.7 |
| 7,183,922 B2 * | 2/2007 | Mendolia et al. | .......... | 340/572.1 |
| 7,194,903 B2 * | 3/2007 | Dwyer | .............................. | 73/493 |
| 7,637,078 B2 * | 12/2009 | Ishiwatari et al. | ................ | 53/52 |
| 7,669,387 B2 * | 3/2010 | Focke et al. | ....................... | 53/234 |
| 7,764,183 B2 * | 7/2010 | Burchell et al. | ............... | 340/585 |
| 7,766,325 B2 * | 8/2010 | Sagi et al. | ....................... | 271/227 |
| 8,191,399 B2 * | 6/2012 | Schwesig | ........................ | 73/1.37 |

(Continued)

FOREIGN PATENT DOCUMENTS

| | | |
|---|---|---|
| DE | 199 41 485 A1 | 10/2000 |
| DE | 101 15 563 A1 | 10/2002 |

(Continued)

*Primary Examiner* — Jennifer Mehmood
*Assistant Examiner* — Rufus Point
(74) *Attorney, Agent, or Firm* — Novak Druce Connolly Bove + Quigg$^{LLP}$

(57) ABSTRACT

An apparatus for the treatment of containers may include a conveying device which conveys the containers along a preset conveying path and a size part which is arranged in an interchangeable manner on the apparatus. The size part may include a first identification element based upon RFID technology in order to identify the size part. The size part may in turn include a position detection device which detects a position of at least one element of the apparatus with respect to the size part and emits a signal characteristic of this position.

10 Claims, 2 Drawing Sheets

(56) References Cited

U.S. PATENT DOCUMENTS

| | | | |
|---|---|---|---|
| 8,383,977 B2* | 2/2013 | Culp et al. | 209/577 |
| 2005/0022470 A1* | 2/2005 | Focke et al. | 53/415 |
| 2005/0164858 A1* | 7/2005 | Focke et al. | 493/68 |
| 2005/0194705 A1* | 9/2005 | Smith | 264/40.1 |
| 2007/0074659 A1* | 4/2007 | Wahlstrom | 118/679 |
| 2007/0163697 A1* | 7/2007 | Kursawe | 156/64 |

FOREIGN PATENT DOCUMENTS

| | | |
|---|---|---|
| DE | 10 2005 006 533 A1 | 8/2006 |
| DE | 10 2005 059 312 A1 | 6/2007 |
| DE | 10 2007 025 521 A1 | 12/2008 |
| WO | 03/025833 A1 | 3/2003 |
| WO | 2005/068301 A1 | 7/2005 |
| WO | 2008/145345 A1 | 12/2008 |

* cited by examiner

APPARATUS FOR THE TREATMENT OF CONTAINERS WITH COMBINED SIZE-PART AND FITTING DETECTION

CROSS-REFERENCE TO RELATED APPLICATION

This application claims the benefit of priority of German Patent Application No. 10 2009 058 087.5, filed Dec. 14, 2009, pursuant to 35 U.S.C. 119(a)-(d), the disclosure of which is incorporated herein by reference.

TECHNICAL FIELD

The present disclosure relates to an apparatus for the treatment of containers and, more particularly, to an apparatus and method for the treatment of containers with combined size-part and fitting detection.

BACKGROUND

Apparatuses of this type have long been known from the prior art. In particular, it is known that beverage containers of this type are produced in a plurality of individual method steps. In this way, it has become customary in recent years for plastics-material pre-forms to be shaped by blow-moulding shaping to form plastics-material containers. After that, these containers can be filled, closed and provided with a label. Steps such as the combination of a plurality of containers to form packs or even the palletization of such packs then follow in further method steps.

In machines of this type, use is frequently made in this case of size parts which can be interchanged in order for example to treat different types of containers. In addition, size parts of this type can be replaced in the event of wear. When replacing size parts in this way, numerous factors have to be taken into consideration. In this way it is necessary to ensure that a size part is used which is adapted to the apparatus itself. In addition, it is also necessary to ensure, however, that the size part is properly arranged on the apparatus and is also properly locked on the apparatus.

In practice it has been found, however, that in part the locking was not already properly tested, which can lead to destruction of the plant. In this way for example when changing the types of bottles and when exchanging the change-over and fitting parts in an associated manner, the locking device has repeatedly not been inserted, and this has led to loose guiding parts which have been damaged in the stream of bottles when starting.

It may be desirable, therefore, to increase the safety of plants of this type and, in particular, also to increase the safety with respect to the correct fitting. In addition, as uncomplicated as possible, it may be desirable to provide a method which will permit the user to check the proper working operation of the machine.

SUMMARY

According to various aspects of the disclosure, an apparatus for the treatment of containers may include a conveying device which conveys the containers along a pre-set conveying path. In addition, the apparatus has a size part which is arranged in an interchangeable manner on the apparatus, the size part having an identification element, for example, based upon RFID technology, in order to identify the size part.

According to various aspects of the disclosure, the size part in turn has a position detection device which detects the position of at least one element of the apparatus with respect to the size part and emits a signal characteristic of this position. It is therefore proposed that the size parts in question should be provided not only with an identification element such as for example an RFID tag, but also with a device which detects a position of part of the apparatus such as for example a closure element with respect to the size part. In this way it is possible to check in a rapid and uncomplicated manner not only whether the correct size part is arranged on the apparatus, but also whether it has been locked on the apparatus in the correct manner. It may be desirable for the size part (also) to be used for conveying the containers.

It may be desirable for an identification, which clearly identifies the size part, to be stored in this size part. This may be for example an identification number or the like. It may be desirable for the size part to take part in the conveying of the containers or for the size part to be an element of the conveying device which conveys the containers.

In the case of an exemplary apparatus the latter also has an interrogation device in order to interrogate the information stored in the first identification element. This can be for example an RFID transmitter which interrogates the information stored in the RFID tag of the size part and compares it for example with its own stored data in order to ascertain in this way whether the size part matches the respective plant.

It may be desirable for the interrogation device or for the apparatus to have an energy supply device (operating inductively for example) in order to supply the first identification element with energy at least temporarily in a wireless manner. In this way the RFID technology may be used in an advantageous manner, the advantage lying in the fact that the identification element itself need not have a separate current source but is supplied in a remote manner by the interrogation device.

In response to an energy supply of this type the identification element can emit signals which on the one hand clearly identify the identification element and which may on the other hand also provide information on whether a proper locking of the size part on the apparatus has taken place. This information can derive in turn from the position detection device. It may therefore be desirable for the position detection device as well to be supplied with energy by the energy supply device.

In an exemplary embodiment, the apparatus may include a fastening device for fastening the size part to the apparatus, and the element of the apparatus may comprise a locking element of this fastening device. In this way the position detection device detects a position of the aforesaid locking element. This detection can be carried out in different ways in this case. It may be desirable for the position detection device to have an inductive proximity switch which thus detects the position of the aforesaid element such as the locking element without contact.

It may be desirable for the identification element to be connected inseparably to the position detection device. In this case "inseparably" is to be understood as meaning that these two devices cannot be separated from each other without damage to the material or destruction of at least one of the two elements being involved in this way.

It is therefore proposed in this case that the position detection device, such as in particular an inductive proximity switch, should be connected to the identification element which may be based on RFID technology. It may be desirable for these two elements to be arranged on a common carrier (tag). It may be desirable for an RFID-INI sensor to be used.

It may be desirable for the first identification element to have a transmission device for the wireless emission of signals. In this case these signals, as mentioned above, are for example signals which clearly identify the size part and which, in addition, may provide information on the position of a locking element.

In the case of an exemplary embodiment the identification element and the position detection device are arranged inseparably on the size part. This is to be understood as meaning, in particular, that neither of these two elements can be removed from the size part without damage to the material or destruction of this or the other part in each case. In this way it is possible to counteract an inadvertent separation of the identification function and the position detection function from the size part.

In the case of an exemplary embodiment the position detection device may be designed in such a way that it determines a locking state of the size part with respect to the apparatus. A size part can be for example a blow mould, a guide rail for containers or plastics-material pre-forms or the like.

It may be desirable for a second identification element, for example based on RFID technology, to be provided on the size part. This second identification element can likewise deliver identification signals to the interrogation device. It is thus possible for a size part to be accepted as being correct only if the two identification elements have been verified. In this way it is possible for an inadvertent insertion of incorrect size parts to be better prevented. It may be desirable for the first identification element and the second identification element to emit their signals independently of each other.

It may be desirable for this second identification element likewise to be connected inseparably to the size part, i.e. for example in such a way that it cannot be detached from the size part without destruction of the identification element and/or of the size part occurring as a result. In addition, it would be possible for an identification element, which likewise may deliver signals to the interrogation device, also to be provided on the apparatus. In this way it is possible to ensure that a specified size part is also fitted at a location on the plant provided therefor.

It may be desirable for the second identification element to be designed in such a way that it emits signals which clearly identify this second identification element. It may be desirable for these signals not to be capable of being altered. In this case it is also possible for these signals to identify a specified group of size parts.

It may be desirable for the interrogation device or the apparatus to have a memory device for storing signals identifying the identification element or data derived therefrom. In addition, it may be desirable for a comparator device to be provided which compares received identification signals with stored data.

In addition, the present disclosure relates to a size part for an apparatus for the treatment of containers and, for example, for separable application on an apparatus of the type described above, the size part having a first identification element based on RFID technology for the identification of the size part and the identification element having a transmission device for the wireless transmission of a piece of information clearly identifying the identification element. According to the disclosure the size part in turn has a position detection device which detects a position of at least one element of the apparatus with respect to the size part. In addition, the size part is equipped in such a way that it also emits a signal characteristic of this position.

It may be desirable for the identification element and the position detection device to be arranged on a common carrier and, for example, to be inseparably connected to each other.

Some further advantages and embodiments may become evident from the accompanying drawings.

DETAILED DESCRIPTION

Figure 1:
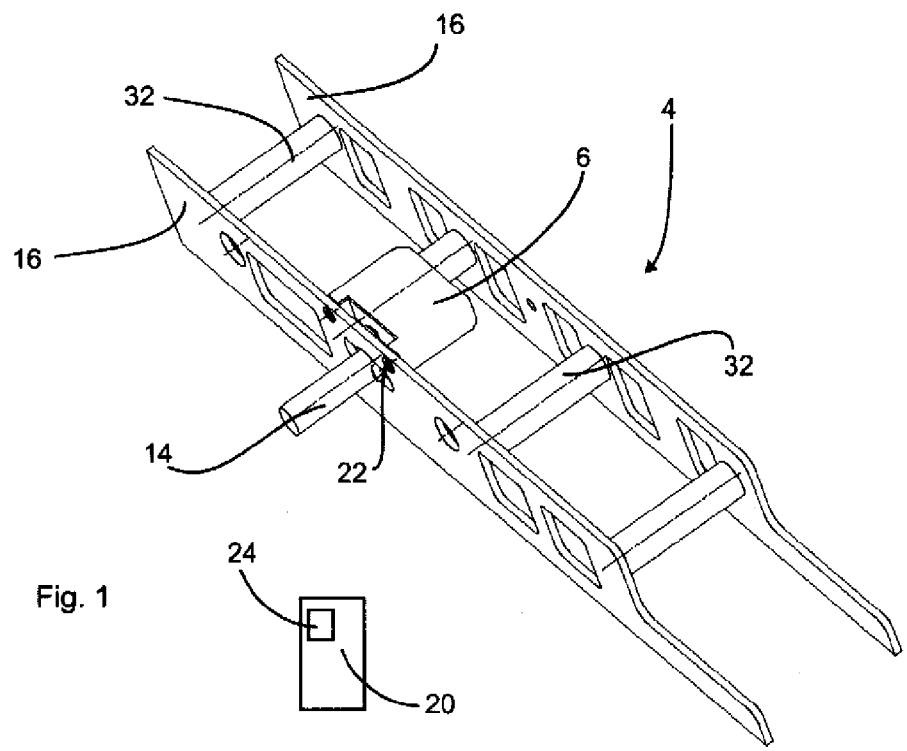
FIG. 1 is a diagrammatic illustration of an exemplary size part of an apparatus according to various aspects of the disclosure.

FIG. 1 shows an exemplary size part 4 which can be arranged on an apparatus for the treatment of containers (not shown). In this case this size part 4 is a rail element. This size part 4 can be removed from the apparatus or exchanged.

In this case the reference number 14 designates a carrier of the apparatus on which the size part 4 is arranged. Here the size part has two rail elements 16 which are connected to each other by way of connecting webs 32.

The reference number 6 designates in its entirety an identification element which in this case is arranged on the size part 4 by way of screw elements 22. This identification element has a memory device in which a characteristic is stored by which this identification element and thus also the size part 4 can be clearly identified. It would also be possible, however, for the identification element to be arranged in a fixed or inseparable manner on the size part, i.e. in such a way that it cannot be separated from the size part 4 without it being damaged or destroyed. In addition, a position detection device (not shown here) is provided, which detects a position of the carrier 14 or a component of the carrier 14 with respect to the size part.

The reference number 20 designates an interrogation device by which the identification element 6 can be read out. This can be for example a portable interrogation device which can interrogate the identification element which may be designed in the form of an RFID tag. For this purpose the interrogation device activates the identification element, and the latter in turn emits a characteristic so that the identification element 6 and thus also the size part 4 can be identified. The reference number 24 designates an energy supply device (in particular operating inductively) in order to supply the identification element wirelessly with energy.

Figure 2:
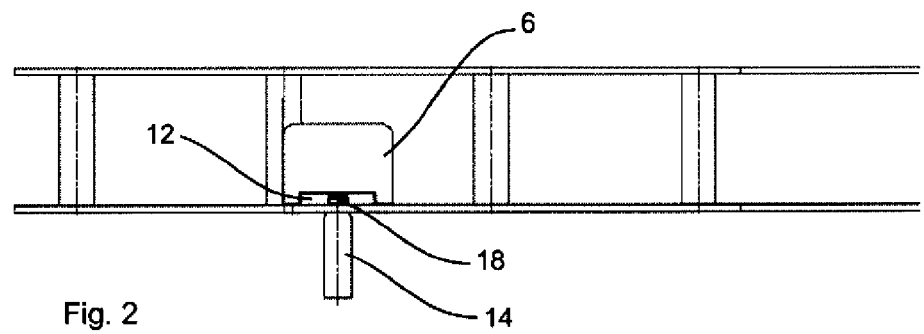
FIG. 2 is a plan view of the size part as shown in FIG. 1.

FIG. 2 is a plan view of the size part as shown in FIG. 1. It will be seen that the identification element designated 6 in its entirety is arranged in a region in which the carrier 14 or an end portion 18 of the carrier 14, which is designed this case in the form of a movable bolt, is also arranged. For this purpose a recess 12 in the identification element 6 is provided, so that this bolt 18 may be arranged in the immediate vicinity of the identification element and may be movable with respect to it at the same time.

Figure 3:
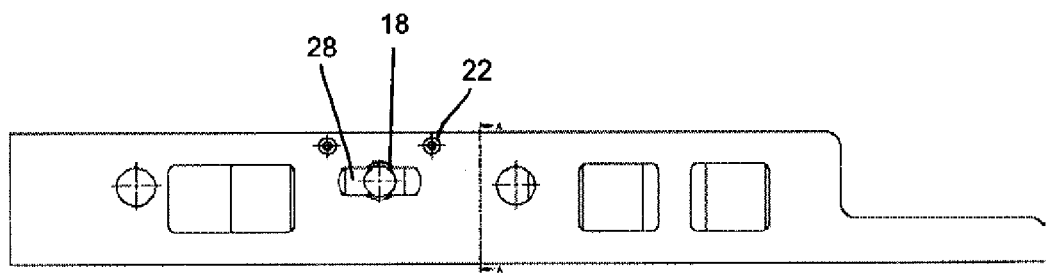
FIG. 3 is a side view of the size part as shown in FIG. 1.

FIG. 3 is a side view of the size part as shown in FIG. 2. Here again the end portion 18 is evident, which in this case extends upwards and downwards, i.e. in the vertical direction. In this way the size part can be fastened to the carrier 14 by pivoting of the bolt in the plane of the figure. As a result of this pivoting the relative position of the bolt with respect to the identification element and the position detection device (not shown) formed jointly with the identification element is changed. In this way, the position detection device can also recognize that the position of the aforesaid bolt has changed. It may be desirable, as mentioned above, for the position detection device to be an inductive proximity switch which can detect a distance from the bolt 18 in this way. It is thus possible for a locking state to be determined. The reference number 28 designates a recess in the carrier 16, through which recess the end portion or bolt can pass.

Figure 4:
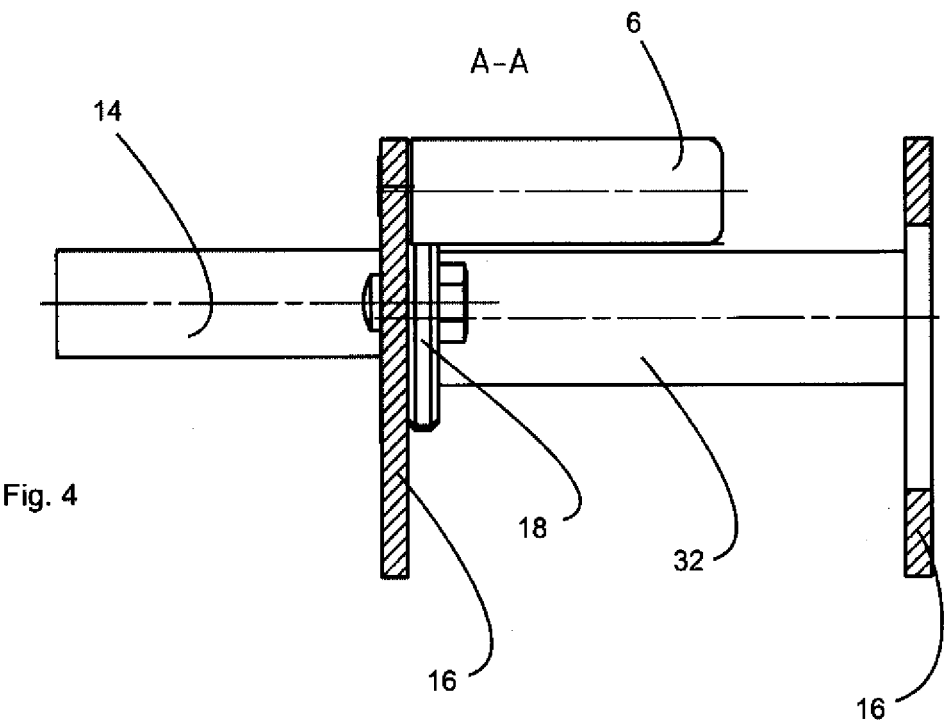
FIG. 4 is a partial illustration of the size part as shown in FIG. 1.

FIG. 4 is a detailed illustration of the situation as shown in FIG. 2. Here again the bolt 18 is evident, which projects in a closed position into a recess in the identification element 6. In this situation the position detection device can detect the position of the bolt in the closed position and can likewise emit this. In addition, the reference number 32 designates a connecting web which connects the lateral parts 16 to each other.

Figure 5:
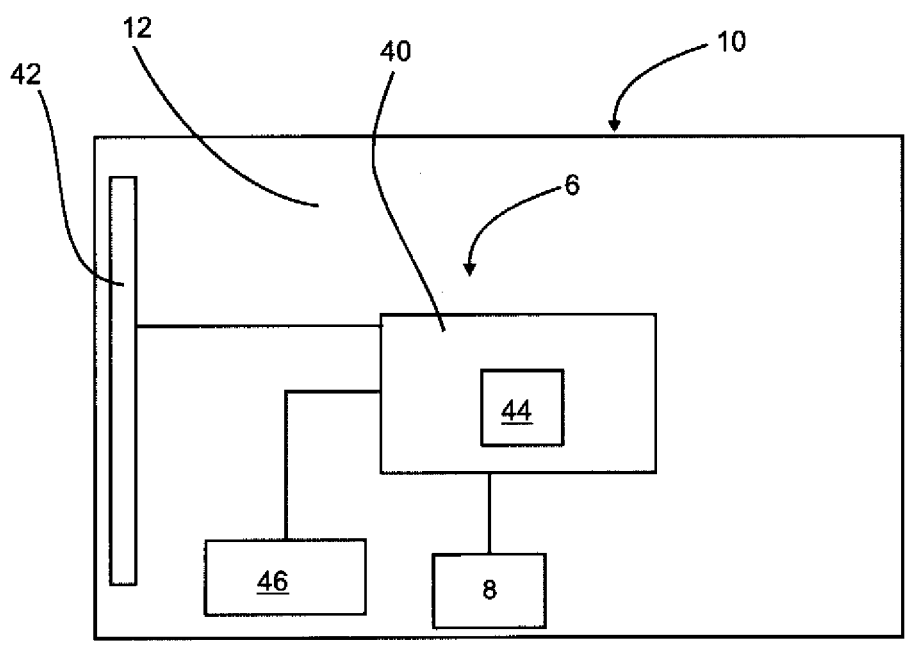
FIG. 5 is an illustration in the manner of a block diagram of an exemplary identification element with a position detection device.

FIG. 5 is an illustration in the manner of a block diagram of the entire identification unit 10 which is formed both from the identification element 6 as well as from the position detection device 8. These two units are arranged on a common carrier 12 and together form a so-called RFID INI sensor.

The reference number 40 designates a control device which in this case both receives signals from the position detection device 8 and is suitable for producing data which are emitted by way of a transmission device 46. The reference number 42 designates an energy absorption device such as an aerial which can be supplied for example by an inductive field and which in this way supplies the processor device 40 and also the position detection device 8 with current.

An address which clearly identifies the identification element 6 is stored in a memory device 44. As soon as the entire unit 16 is supplied with energy by way of the aerial 42, it can deliver—by way of the transmission device 46—the aforesaid signal which is used for the identification of the size part and also a signal which is characteristic of the position of the bolt 18.

On account of the joint arrangement of the position detection device 8 and of the identification element 6 on the same carrier, it is possible for them to be connected to each other in an inseparable manner. In this case the identification element makes use of the electromagnetic spectrum in order to transmit information without contact. The identification element can thus deliver the information to the interrogation device 20 without contact.

In addition, the interrogation device 20 has an electronic circuit and an aerial in order to supply the identification element 6, or in more precise terms the combination of the identification element 6 and the position detection device 8, with energy. In the prior art different frequency ranges are used for the RFID technology, such as for example 125 kHz, 13.56 MHz, and 2.45 GHz. In some aspects, it may be desirable for a frequency range of 13.56 MHz to be used for the information transmission.

In some aspects such as for example filling devices and labelling machines, and in some aspects such as for example those machines which are provided with so-called rap-tec fittings (containers with quick-change operation), can be operated with the technology illustrated here.

It will be apparent to those skilled in the art that various modifications and variations can be made to the apparatus for the treatment of containers with combined size-part and fitting detection of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for the treatment of containers, comprising:
a conveying device which conveys the containers along a pre-set conveying path, the conveying device including a size part, which is arranged in an interchangeable manner on the apparatus, the size part having a first identification element based upon RFID technology in order to identify the size part, the size part including a position detection device which detects a position of at least one element of the apparatus with respect to the size part and emits a signal characteristic of said position, the at least one detected element being different from the size part, wherein the position detection device is secured on an outward surface of the size part and connected to the first identification element so as to enable the first identification element when activated.

2. An apparatus according to claim 1, further comprising an interrogation device configured to interrogate the information stored in the first identification element.

3. An apparatus according to claim 1, further comprising a fastening device for fastening the size part to the apparatus, and the at least one element is a locking element of the fastening device.

4. An apparatus according to claim 1, wherein the identification element is connected inseparably to the position detection device.

5. An apparatus according to claim 1, wherein the identification element includes a transmission device for the wireless emission of signals.

6. An apparatus according to claim 1, wherein the identification element and the position detection device are arranged on a common carrier.

7. An apparatus according to claim 1, wherein the identification element and the position detection device are arranged inseparably on the size part.

8. An apparatus according to claim 1, wherein the position detection device is designed in such a way that it determines a locking state of the size part with respect to the apparatus.

9. An apparatus according to claim 1, wherein the first identification element includes a memory device for storing signals identifying at least one of the identification element and data derived therefrom.

10. A size part for separable application on an apparatus for the treatment of containers, wherein the apparatus includes a conveying device which conveys the containers along a pre-set conveying path, the size part comprising:
a first identification element based on RFID technology for the identification of the size part, and wherein the identification element includes a transmission device for the wireless transmission of a piece of information identifying the identification element, wherein the size part in turn has a position detection device which detects a position of at least one element of the apparatus with respect to the size part and emits a signal characteristic of this position, the at least one detected element being different from the size part, wherein the position detection device is secured on an outward surface of the size part and connected to the first identification element so as to enable the first identification element when activated.

* * * * *